United States Patent
Liu et al.

(10) Patent No.: US 9,220,140 B2
(45) Date of Patent: Dec. 22, 2015

(54) LED LIGHTING DRIVER

(71) Applicant: GREENMARK TECHNOLOGY INC., New Taipei (TW)

(72) Inventors: Kwang-Hwa Liu, New Taipei (TW); Shen-Yao Liang, Tainan (TW)

(73) Assignee: GREENMARK TECHNOLOGY INC., New Taipei (TW)

( * ) Notice: Subject to any disclaimer, the term of this patent is extended or adjusted under 35 U.S.C. 154(b) by 345 days.

(21) Appl. No.: 13/659,926

(22) Filed: Oct. 25, 2012

(65) Prior Publication Data

US 2014/0117854 A1    May 1, 2014

(51) Int. Cl.
*H05B 37/00* (2006.01)
*H05B 33/08* (2006.01)

(52) U.S. Cl.
CPC .............. *H05B 33/083* (2013.01); *Y02B 20/348* (2013.01)

(58) Field of Classification Search
CPC ............. H05B 33/083; H05B 33/0812; H05B 33/0815; H05B 33/089; H05B 33/0803; H05B 33/0893; Y10S 362/80
USPC .......................................... 315/121, 122, 123
See application file for complete search history.

(56) References Cited

U.S. PATENT DOCUMENTS

| | | | |
|---|---|---|---|
| 5,457,450 A | 10/1995 | Deese et al. | |
| 5,936,599 A | 8/1999 | Reymond | |
| 5,959,413 A | 9/1999 | Komarek et al. | |
| 6,153,980 A | 11/2000 | Marshall et al. | |
| 6,236,331 B1 | 5/2001 | Dussureault | |
| 6,600,274 B1 | 7/2003 | Hughes | |
| 7,009,580 B2 | 3/2006 | Leung | |
| 7,327,051 B2 | 2/2008 | Ito et al. | |
| 7,339,323 B2 | 3/2008 | Bucur | |
| 7,439,944 B2 | 10/2008 | Huynh et al. | |
| 7,609,008 B1 | 10/2009 | Kohler | |

(Continued)

FOREIGN PATENT DOCUMENTS

| | | |
|---|---|---|
| CN | 101000745 | 7/2007 |
| CN | 101854758 | 10/2010 |

(Continued)

OTHER PUBLICATIONS

"Office Action of China Counterpart Application", issued on Mar. 24, 2015, p. 1-p. 5.

*Primary Examiner* — Douglas W Owens
*Assistant Examiner* — Monica C King
(74) *Attorney, Agent, or Firm* — Jianq Chyun IP Office

(57) ABSTRACT

A light-emitting diode (LED) lighting driver is provided, which includes a bridge rectifier, multiple LED sections, multiple shunt regulators, a weighted current mirror array, a mean power integrator, and a reference generator. The bridge rectifier provides a rectified sinusoidal voltage. The LED sections are coupled in series and coupled to the rectified sinusoidal voltage. Each shunt regulators regulates a shunt current flowing out from the LED sections according to a current reference value. The weighted current mirror array provides a plurality of copy currents. Each copy currents tracks the conduction time of one shunt regulator and also tracks the instantaneous output power of the LED sections. The mean power integrator provides a mean power value by integrating the copy currents. The reference generator provides the current reference values. Each current reference values is directly proportional to the difference between a mean power reference value and the mean power value.

13 Claims, 8 Drawing Sheets

(56) References Cited

U.S. PATENT DOCUMENTS

| | | |
|---|---|---|
| 7,649,326 B2 | 1/2010 | Johnson et al. |
| 7,781,979 B2 | 8/2010 | Lys |
| 7,986,107 B2 | 7/2011 | Weaver et al. |
| 8,008,864 B2 | 8/2011 | Nguyen et al. |
| 8,174,212 B2 | 5/2012 | Tziony et al. |
| 2011/0273102 A1* | 11/2011 | van de Ven et al. ............ 315/193 |
| 2012/0229030 A1* | 9/2012 | Moskowitz et al. ........... 315/122 |

FOREIGN PATENT DOCUMENTS

| | | |
|---|---|---|
| CN | 102111932 | 6/2011 |
| WO | 2011096680 | 8/2011 |

* cited by examiner

LED LIGHTING DRIVER

BACKGROUND OF THE INVENTION

1. Field of the Invention

The present invention relates to a light emitting diode (LED) lighting driver. More particularly, the present invention relates to an LED lighting driver including a feedback control loop based on the mean output power of the LED sections.

2. Description of the Related Art

Linear light-emitting diode (LED) lighting drivers have been proposed in recent years. They can be directly connected to utility alternating current (AC) voltage and power up an array of LED devices without the need for bulky and expensive switching-mode LED drivers.

However, recent attempts to implement the conventional linear driver into actual LED lighting products have encountered a major power regulation issue. Namely, a linear LED lighting driver supplies insufficiency illumination power when the utility AC voltage is lower, whereas it supplies excessive illumination power when the utility AC voltage is higher.

This issue arises mainly due to there are various utility AC voltages around the world. The utility AC voltage in Japan is 100Vrms. Most Latin American countries have utility AC voltage of 110Vrms, 120Vrms, or 127Vrms. USA, Canada, and some other countries use 120Vrms. China, India, Australia, and most European countries have utility AC voltage ranging from 220Vrms to 240Vrms.

Unfortunately, a conventional linear LED lighting rated at 500 lumens in 120Vrms utility AC voltage countries, such as USA and Canada, will only provide about 370 lumens in 100Vrms utility AC voltage countries, such as Japan.

The following is a discussion of circuit structures of conventional linear LED lighting drivers and why they have poor output power regulation against input AC voltage variation.

FIG. 1 is a schematic diagram showing the basic structure of a conventional linear LED lighting driver. As shown in FIG. 1, three LED sections (LD1, LD2, and LD3) are connected in series. The voltage source 101 represents the utility AC voltage input. Bridge rectifier 102 rectifies the utility AC voltage input and outputs the rectified sinusoidal voltage input, VIN 103. The anode of LD1 is connected to the rectified sinusoidal voltage input, VIN 103. The anode of a downstream LED section is connected to the cathode of its up-stream LED section. Please notice that each LED section may include multiple LED devices configured in various series and/or parallel connection.

LED section LD1 has a forward voltage of VF1; LED section LD2 has a forward voltage of VF2; LED section LD3 has a forward voltage of VF3. In this example, VF1=70V; VF2=35V; and VF3=35V.

The linear LED lighting driver in FIG. 1 includes the same number of shunt regulators (SR1, SR2, and SR3). Each shunt regulator SR(n) includes a high-voltage metal-oxide-semiconductor field-effect transistor (MOSFET) (Q1, Q2, Q3), a current-sense resistor (R1, R2, R3), an operational amplifier (OPA1, OPA2, OPA3), and a comparator (CMP1, CMP2, CMP3), wherein n is a positive integer. Notice that CMP1 is not necessary in this example but is shown for the purpose of general discussion.

The cathode of each LED section LD1-LD3 is coupled to the rectified sinusoidal voltage power ground 104, via shunt regulator SR(n).

Each operational amplifier OPA(n) receives a pre-determined current reference value, REF(n)=REF1*r(n) and regulates the shunt current, ISH(n), according to the current reference value REF(n).

Shunt regulator SR1 is activated when VIN 103 rises above VF1 or 70V. When VIN 103 further rises above [VF1+VF2], or 105V, shunt regulator SR2 starts to conduct current. When the voltage level due to the shunt current ISH2 flowing through R2 rises above a preset value VTH, comparator CMP2 outputs a logical high signal, which turns off shunt regulator SR1. Then if VIN 103 further rises above [VF1+VF2+VF3], or 140V, shunt regulator SR3 starts to conduct current. When the voltage level across R3 rises above the value VTH, comparator CMP3 issues a logical high signal, which turns off shunt regulators SR1 and SR2.

During the time when shunt regulator SR(n) is activated, if ISH(n)*R(n)<REF(n), OPA(n) will bring higher the gate voltage of MOSFET Q(n), allowing more current to flow through. On the other hand, when ISH(n)*R(n)>REF(n), OPA(n) will bring lower the gate voltage of MOSFET Q(n), allowing less current to flow through. By the high gain of OPA(n), typically higher than 60 dB, ISH(n) is controlled precisely at a level of ISH(n)=REF(n)/R(n), as long as there is sufficient headroom voltage across the shunt regulator SR(n).

On the other hand, comparator CMP(n) receives a threshold reference value VTH. If shunt current ISH(n) rises above VTH/R(n), comparator CMP(n) turns off all up-stream shunt regulators, SR1 to SR(n−1). If shunt current ISH(n) drops below VTH/R(n), comparator CMP(n) re-activates its immediate up-stream shunt regulator SR(n−1). Typically, VTH value is set to 20% to 50% of REF1.

Notice that when shunt regulator SR(n) is in a steady-state operation, wherein its shunt current ISH(n) is higher than VTH/R(n), all other shunt regulators are in OFF state. Since comparator CMP(n) issues a logical high signal when shunt regulator SR(n) is in a steady-state operation, the output signal of comparator CMP(n) can be used to indicate the conduction time of shunt regulator SR(n).

A high-voltage (HV) linear regulator 105 consists of a high-voltage MOSFET Q9, a pull-up resistor R9, a zener reference diode D9, and a filter capacitor C9. HV linear regulator 105 is coupled to the rectified sinusoidal voltage, VIN 103, to supply a low voltage source VCC to power the shunt regulators SR(n).

The following is a discussion regarding the square current waveform control mechanism of the conventional linear LED lighting driver in FIG. 1. Referring to FIG. 2, in this case, all 3 shunt regulators regulate at the same current level. REF1=REF2=REF3. In another word, the shunt current ratio r2=ISH2/ISH1=1.0; r3=ISH3/ISH1=1.0. As shown in FIG. 2, the LED current is maintained at 60 mA from T1 to T6.

For simplicity of discussion, assume again VF1=70V, VF2=VF3=35V. The regulation level of each shunt regulator is set up to be 60 mA equally. In FIG. 2, curve 201 represents the rectified sinusoidal voltage waveform of VIN when the AC line voltage is 100Vrms. Curve 202 represents the voltage across the active LED sections. It has discrete steps of 70V, 105V, and 140V.

From T0 to T1, when VIN 201 is less than 70V, none of the LED sections is in conduction. At T1, VIN 201 rises above 70V, LED section LD1 starts to conduct. Between T1 and T2, voltage across LD1 remains at 70V. Shunt regulator SR1 keeps ISH1 regulated at 60 mA level, with Q1 absorbing the differential voltage of VIN−70V.

At time T2, VIN 201 rises above 105V, LD2 starts to conduct. ISH2 rises quickly. Once ISH2*R2 rises above VTH level, comparator CMP2 turns off shunt regulator SR1.

Between T2 and T5, the combined forward voltage across LED sections LD1 and LD2 remains 105V. Shunt regulator SR2 keeps ISH2 regulated at 60 mA level, with Q2 absorbing the differential voltage of VIN–105V.

However, since the peak voltage of VIN 201 only reaches 139.4V (=100V*1.414−2V), LED section LD3 never conducts. LED section LD2 is in conduction from T2 until T5, when VIN 201 drops below 105V again. At T5, ISH2*R2 drops below VTH level. The output of comparator CMP2 goes low, which re-activates shunt regulator SR1. At T6, VIN 201 drops below 70V, and ISH1 drops to zero.

On the other hand, when the AC line voltage is at 120Vrms, the rectified sinusoidal voltage VIN is shown in FIG. 2 as curve 204, whereas curve 205 represents the voltage across the active LED sections at different time points.

The circuit operation in the case of 120Vrms is similar to the case of 100Vrms, except LED section LD3 now conducts from T3 to T4, when VIN 204 rises above 140V. The peak voltage of a 120Vrms line voltage is near 166V. The conduction time of shunt regulator SR3 is about 3.0 ms.

In the case of VIN=100Vrms, 60 Hz, it is calculated that T1=1.412 ms, T2=2.295 ms, T5=6.038 ms, and T6=6.921 ms. The average power of the LED lighting over a half line cycle can be determined as follows, The output power Pout=60 mA*[70V*(T12+T56)+105V*(T25)]/8.333 ms=3.720 W, wherein T12=T2−T1; T56=T6−T5; T25=T5−T2. Notice that the LED current conduction time in a half line cycle is T6−T1=6.921−1.412=5.509 ms.

In the case of VIN=120Vrms, 60 Hz, it is found that T1=1.155 ms, T2=1.817 ms, T3=2.663 ms, T4=5.670 ms, T5=6.516 ms, and T6=7.178 ms.

The LED lighting output power, Pout, now includes the contribution from LD3.

In the case of VIN=120Vrms, 60 Hz, the output power Pout=60 mA*[70V*(T12+T56)+105V*(T23+T45)+140V*(T34)]/8.333 ms=4.977 W, wherein T12=T2−T1; T23=T3−T2; T34=T4−T3; T45=T5−T4; T56=T6−T5. Please notice that the conduction time in a half line cycle is now 7.178−1.155=6.023 ms.

Assume the LED devices used in the FIG. 1 circuit has efficacy of 100 lumens per watt, in the case of 100Vrms line voltage, the light output is 372 lumens; whereas in the case of 120Vrms line voltage, it has increased to 498 lumens, or 33.8% more lumens. In comparison, the conduction time has increased from 5.509 ms to 6.023 ms, or only about 9.33% more. This disparity of LED output power is a major drawback of conventional linear LED lighting drivers.

In a location where the utility AC voltage is 127Vrms, the light output will increase to 522 lumens. That is 40.3% more lumens than the 100Vrms case. Furthermore, it is calculated that the actual input power, Pin, is increased to 6.16 W. This excessive power dissipation will make the LED sections to heat up substantially. In general, LED sections running at elevated temperature will degrade their reliability and usable life.

The following is a discussion regarding the stacked current waveform control mechanism of the conventional linear LED lighting driver in FIG. 1. Please refer to FIG. 3.

One way to improve efficiency and to make current waveform more similar to the sinusoidal waveform of the rectified sinusoidal voltage is to apply a staircase or a stacked current waveform. In this case, the shunt current ratios r2 and r3 are chosen with the following relationship: r3>r2>1.0.

As an example, the shunt regulators in the FIG. 1 circuit can have different current reference levels. For example, ISH1=60 mA, ISH2=72 mA, ISH3=84 mA. This is equivalent to setting r2=1.2, and r3=1.4. In FIG. 3, curve 301 represents the rectified sinusoidal voltage waveform of VIN when the AC line voltage is 100Vrms. Curve 302 represents the voltage across the active LED sections. Curve 303 shows the stacked current waveform at VIN=100Vrms. The LED output power is calculated as 3.953 W.

At VIN=120Vrms, the rectified sinusoidal voltage waveform of VIN is shown as curve 304 and the voltage across the active LED sections is shown as curve 305. The stacked current waveform is shown as curve 306, which has an additional 84 mA step for ISH3. The LED output power is increased to 5.423 W, or 41.1% more than the 100Vrms case.

The line regulation of the stacked current waveform is in general slightly worse than that of the square current waveform. This is expected since the power contribution from LED section LD3 is even more pronounced.

In summary, conventional LED lighting drivers have some limitations. The first limitation is poor output power regulation against AC line voltage variation. The second limitation is that LED current will drop to zero when the rectified sinusoidal voltage VIN drops below the forward voltage of the first LED section during a half line cycle.

As explained previously, the AC line voltage value greatly affects the LED output power. In fact, the average LED output power over a half line cycle can be properly described by the following equation, $$[VF1*ISH1*(T12+T56)+VFS2*ISH2*(T23+T45)+ VFS3*ISH3*(T34)]/8.33 \text{ ms} \qquad \text{Eq. (1)}$$

where T12=T2−T1; T23=T3−T2; T34=T4−T3; T45=T5−T4; T56=T6−T5. VFS(n) is the combined forward voltage of LED sections LD1 through LD(n). For example, VFS2=VF1+VF2; VFS3=VF1+VF2+VF3.

Also, T1=SIN$^{-1}$ (VF1/Vpk)*8.33 ms; T2=SIN$^{-1}$ (VFS2/Vpk)*8.333 ms; T3=SIN$^{-1}$ (VFS3/Vpk)*8.333 ms; where Vpk is the peak value of the rectified sinusoidal voltage VIN.

SUMMARY OF THE INVENTION

Accordingly, the present invention is directed to an LED lighting driver which can maintain constant output power against input AC voltage variation. Another aspect of the present invention is to provide a solution to maintain the LED current at a constant value throughout a line cycle.

According to an embodiment of the present invention, an LED lighting driver is provided. The LED lighting driver includes a bridge rectifier, multiple LED sections, multiple shunt regulators, a weighted current mirror array, a mean power integrator, and a reference generator. The bridge rectifier provides a rectified sinusoidal voltage by receiving and rectifying a utility AC voltage. The LED sections are coupled in series. The first LED section is coupled to the rectified sinusoidal voltage. The shunt regulators are coupled to the LED sections. Each of the shunt regulators regulates a shunt current according to a current reference value. Each of the shunt currents flows from a terminal of one of the LED sections to a ground. The weighted current mirror array is coupled to the shunt regulators and provides a plurality of copy currents. Each of the copy currents tracks a conduction time of one of the shunt regulators and also tracks the instantaneous output power of the LED sections. The mean power integrator is coupled to the weighted current mirror array and provides a mean power value by integrating the copy currents. The reference generator is coupled to the mean power integrator and the shunt regulators. The reference generator provides the current reference values to the shunt regulators.

Each of the current reference values is directly proportional to the difference between a mean power reference value and the mean power value.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
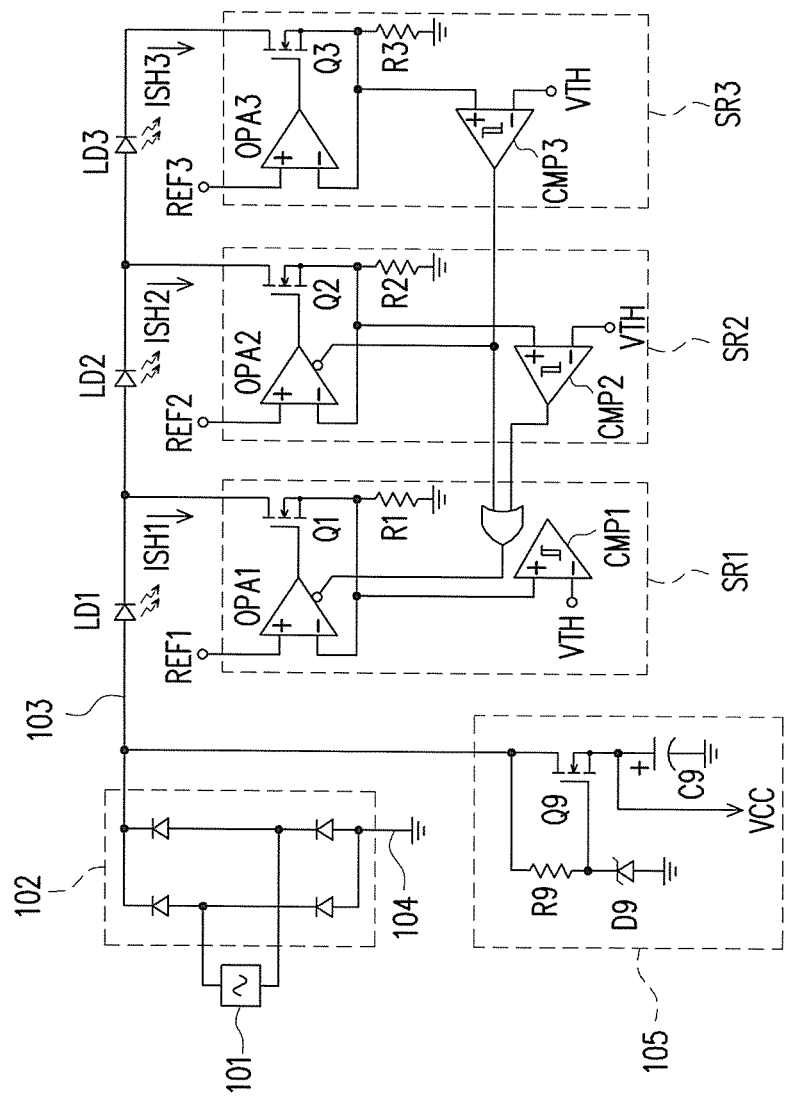
FIG. 1 is a schematic diagram showing a conventional LED lighting driver.

Reference will now be made in detail to the present embodiments of the invention, examples of which are illustrated in the accompanying drawings. Wherever possible, the same reference numbers are used in the drawings and the description to refer to the same or like parts.

Figure 4:
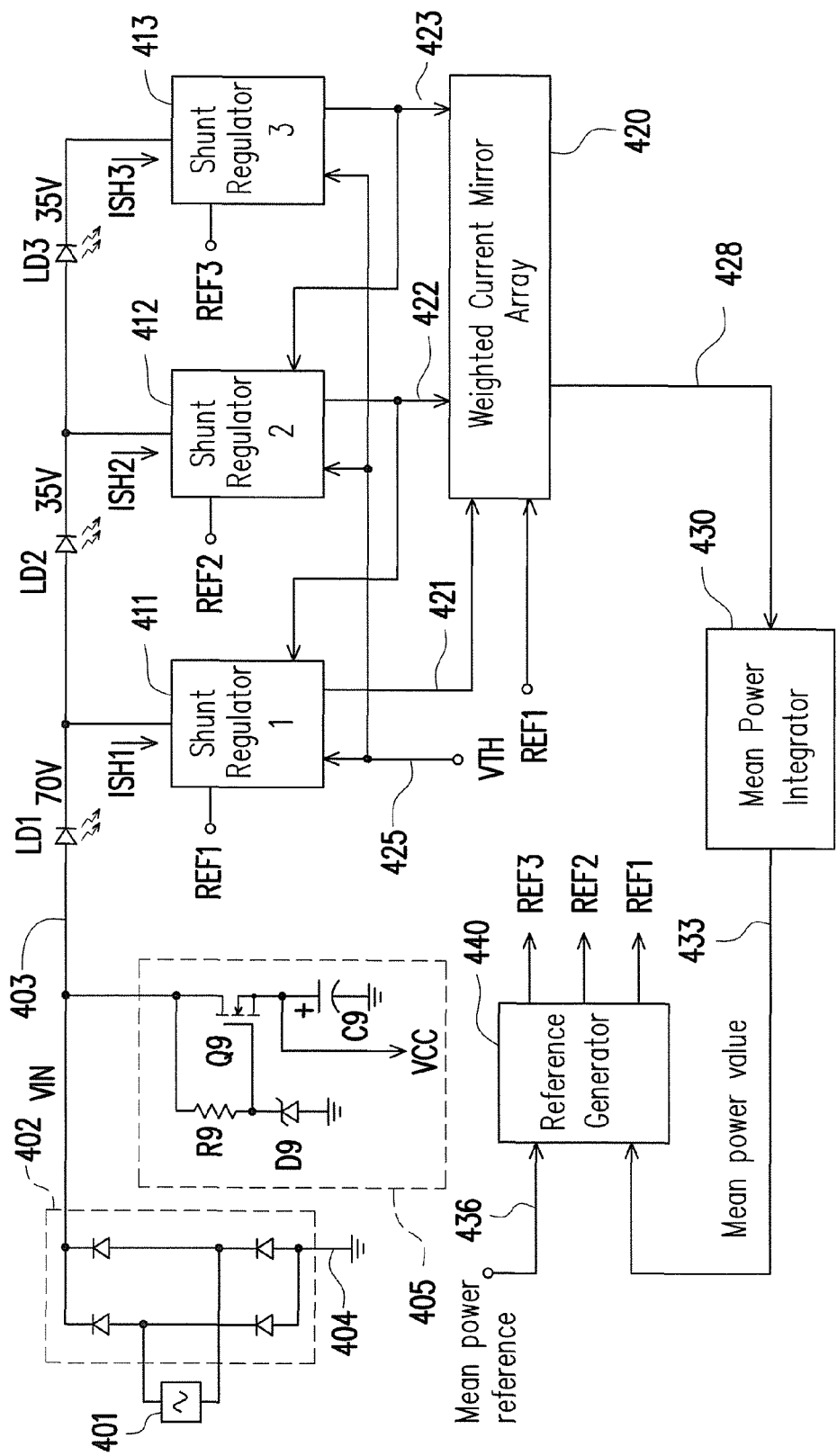
FIG. 4 and FIG. 5 are schematic diagrams showing an LED lighting driver according to embodiments of the present invention.

In order to have a more accurate estimate of the average LED output power, the present invention incorporates a weighted current mirror array and a mean power integrator to monitor the actual average output power in a real-time manner. FIG. 4 shows a preferred embodiment of the present invention. In addition to the LED sections and shunt regulators of a conventional linear LED lighting driver, it further includes a weighted current mirror array 420, a mean power integrator 430, a current reference generator 440, and a mean power reference (MPR) value 436.

The voltage source 401 represents the utility AC voltage input. Bridge rectifier 402 rectifies the utility AC voltage input and outputs the rectified sinusoidal voltage input, VIN 403. HV linear regulator 405 is the same as its counterpart 105 in FIG. 1 and is coupled to the rectified sinusoidal voltage, VIN 403, to supply a low voltage source VCC to power the shunt regulators 411-413.

Figure 5:
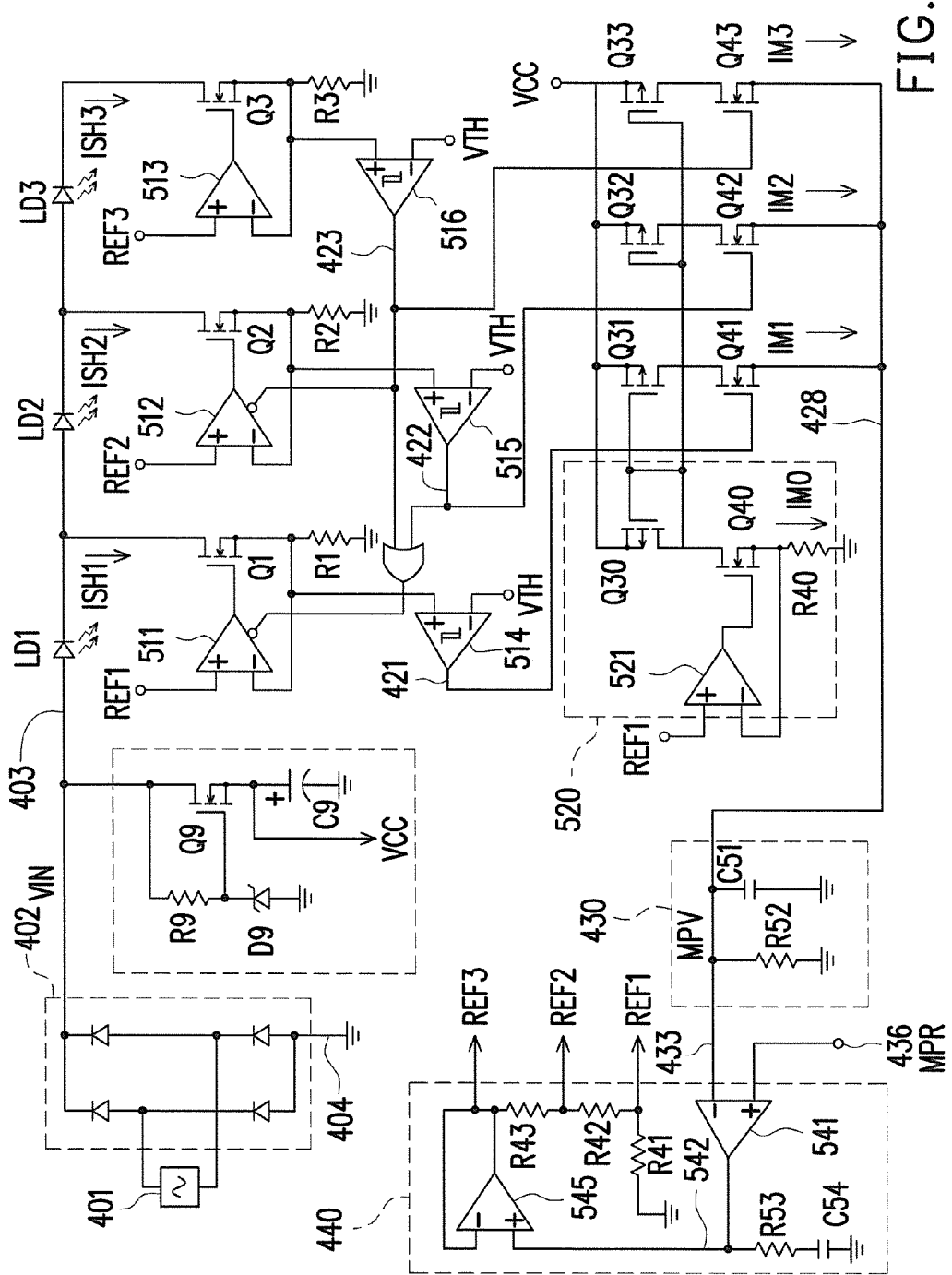

More detailed schematics of the FIG. 4 embodiment is shown in FIG. 5. Shunt regulators SR(n) (411, 412 and 413) are similar to their counterparts in FIG. 1. Each shunt regulator 411-413 includes a high-voltage MOSFET (Q1, Q2, Q3), a current-sense resistor (R1, R2, R3), an operational amplifier (511-513), and a comparator (514-516). The cathode of each LED section LD1-LD3 is coupled to the rectified sinusoidal voltage power ground, 404, via the corresponding shunt regulator SR(n). The said current reference generator 440 generates reference values REF1, REF2, and REF3 for shunt regulators 411, 412, and 413. Each shunt regulator 411-413, when activated, maintains a constant current level according to its current reference input, REF(n). Most details of the shunt regulators 411-413 are already discussed in the discussion regarding the FIG. 1 circuit. So they are omitted here.

The shunt regulators 411-413 are coupled to the LED sections LD1-LD3. The weighted current mirror array 420 is coupled to the shunt regulators 411-413. The mean power integrator 430 is coupled to the weighted current mirror array 420. The reference generator 440 is coupled to the mean power integrator 430 and the shunt regulators 411-413.

Also shown in FIG. 5, the said weighed current-mirror array 420 includes a primary current mirror 520, current switches Q41, Q42, and Q43, and p-channel MOSFETs (PMOSFETs) Q31, Q32, and Q33 for generating current-mirror copy currents IM0, IM1, IM2, and IM3. IM0 is also referred to as the primary current. The MOSFETs Q31 and Q41 constitute the first secondary branch of the weighed current-mirror array 420. The MOSFETs Q32 and Q42 constitute the second secondary branch of the weighed current-mirror array 420. The MOSFETs Q33 and Q43 constitute the third secondary branch of the weighed current-mirror array 420.

The said primary current mirror 520 includes an operational amplifier 521, a PMOSFET Q30, an n-channel MOSFET (NMOSFET) Q40, and a set-up resistor R40. Operational amplifier (op-amp) 521 receives the first current reference value REF1 from the current reference generator 440. If the ratio of R40/R1 is set to 1000, then op-amp 521 produces a primary current-mirror copy current IM0 with a value equal to 0.1% of the shunt current ISH1. For example, if ISH1 is regulated at 60 mA, then IM0 is equal to 60 uA.

Once IM0 is essentially made in direct proportion to ISH1, it can be mirrored accurately to currents IM1, IM2, and IM3 with a weighted factor, WF(n). IM(n)=WF(n)*IM0, which means IM1=WF1*IM0, IM2=WF2*IM0 and IM3=WF3*IM0. WF(n) can be designed to any arbitrary values by using proportional channel width to channel length ratios for PMOSFETs Q31, Q32, and Q33, with respect to PMOSFET Q30. Please refer to Chapter 5, "Passive and Active Current Mirrors" of Razavi's book "Design of Analog CMOS Integrated Circuits" for more details.

Current mirror copies IM1, IM2, and IM3 are coupled to the said mean-power integrator 430 via current switches Q41, Q42, Q43, respectively. The gate terminal of current switch Q41 is coupled to the output signal 421 of comparator 514. Therefore, whenever shunt regulator 411 is activated, signal 421 goes high, which turns on current switch Q41. Thus, current mirror copy IM1 flows into the mean power integrator 430 whenever ISH1 is in conduction. Similarly, the output signal 422 of comparator 515 controls the conduction time of current IM2 flowing into the mean power integrator 430 via current switch Q42. The output signal 423 of comparator 516 controls the conduction time of current IM3 flowing into the mean power integrator 430 via current switch Q43.

The said weighted factor, WF(n) is designed according to the following formula: WF(n)=k*r(n)*VFS(n). Please notice r1=1.0 by definition; r2 and r3 are the aforementioned predefined ratios, and k=R1/R40=0.001. It can be seen that the weight factor WF(n) is directly proportional to an arithmetic product of two factors, namely, r(n) and VFS(n). r(n) is directly proportional to the current reference value REF(n) received by the shunt regulator SR(n). VFS(n) is the combined forward voltage of the LED sections from LD1 through LD(n). Therefore, each copy current IM(n) tracks the instantaneous output power of the LED sections LD1-LD3.

Now, it becomes clear that the current mirror copies flowing into the mean power integrator 420 over a half line cycle is $$[WF1*REF1*(T12+T56)+WF2*REF1*(T23+T45)+WF3*REF1*(T34)]/8.33\text{ ms} = [k*VF1*REF1*(T12+T56)+k*r2*VFS2*REF1*(T23+T45)+k*r3*VFS3*REF3*(T34)]/8.33\text{ ms} = k*[VF1*ISH1*(T12+T56)+VFS2*ISH2*(T23+T45)+VFS3*ISH3*(T34)] \quad \text{Eq. (2)}$$

The mean power integrator 430 includes a low-pass filtering capacitor C51 and a weighted-ratio scaling resistor R52 coupled in parallel. The copy currents IM1, IM2 and IM3 from the weighted current mirror array 420 flowing into the mean power integrator 430 generate a mean-power value (MPV) 433. Since the mean power generator 430 integrates the copy currents IM1, IM2 and IM3, the mean power value 433 tracks the mean output power of the LED sections LD1-LD3.

The current reference generator 440 includes an op-amp 541, a compensation network consisting of a resistor R53 and a capacitor C54, a voltage buffer 545, and a voltage divider consisting of resistors R41, R42 and R43. The said mean-power value 433 is coupled to the inverting input of op-amp 541. Furthermore, a pre-determined mean-power reference 436 is coupled to the non-inverting input of op-amp 541. Since the DC gain of op-amp 541 is quite high, typically more than 60 dB, if there is any mismatch between signal 433 and signal 436, an error voltage 542 will be produced.

Voltage buffer 545 is an operational amplifier connected as a unity-gain amplifier. Voltage buffer 545 receives and outputs the said error voltage 542. The voltage divider (R41-R43) is coupled to voltage buffer 545 and shunt regulators 411-413. The voltage divider (R41-R43) generates the current reference values REF(n) by dividing the error voltage 542. The resistors R41-R43 of the voltage divider have pre-determined resistance ratios in order to generate appropriate current reference values REF(n). These current reference values feed into shunt regulators 411, 412 and 413. REF1 is also coupled to the weighted current mirror array 420.

The compensation network includes a resistor R53 and a capacitor C54 coupled in series between the error voltage 542 and the ground 404. The compensation network renders a low cross-over frequency for the operational amplifier 541.

Figure 6:
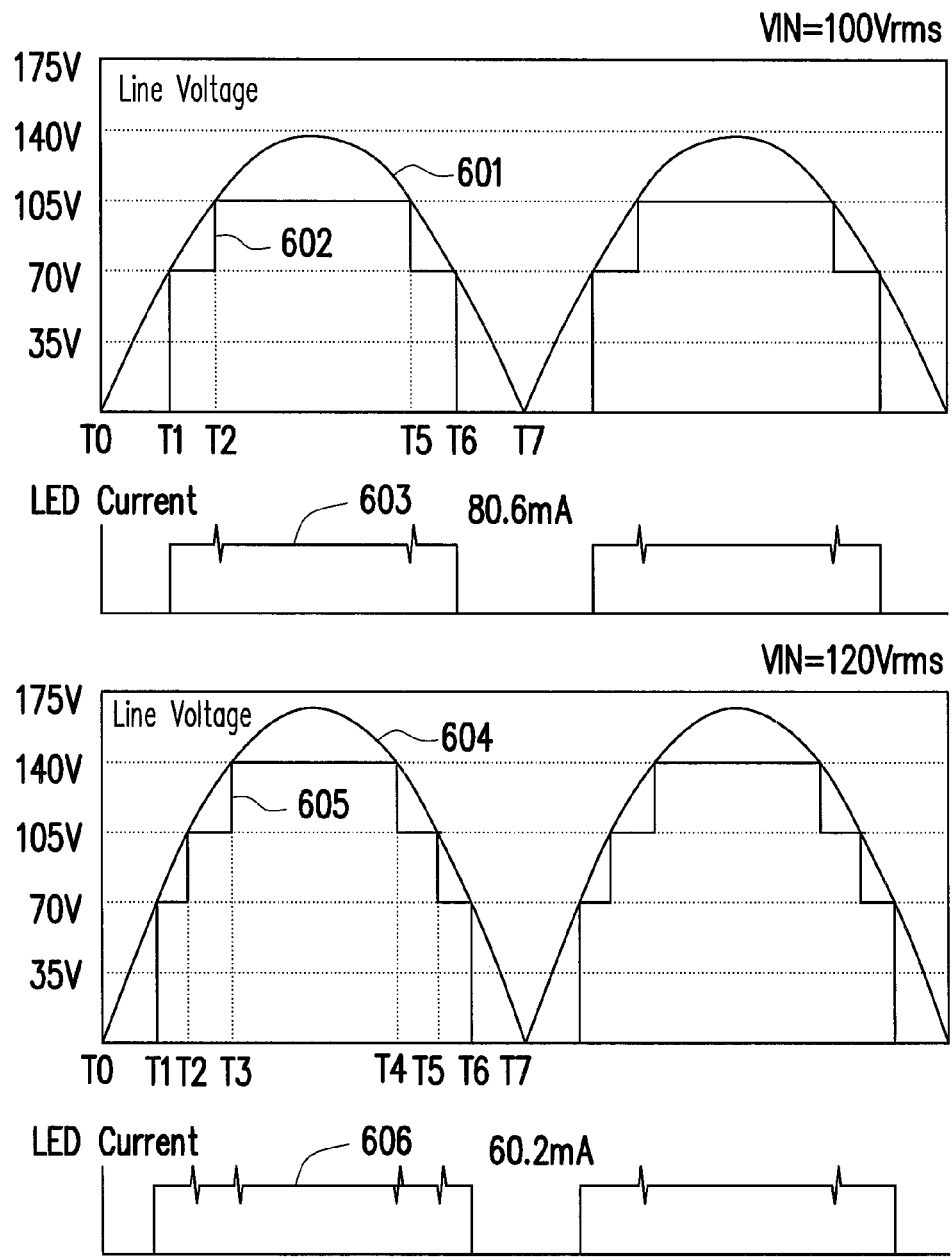
FIG. 6 is a schematic diagram showing waveforms of utility line voltages and LED currents in the LED lighting drivers shown in FIG. 4 and FIG. 5.

FIG. 6 shows the improved output power regulation of the FIG. 5 embodiment. The output power is set up for 5.0 W. Also, it uses a square-wave current design, namely, r2=r3=1.0. When the AC line voltage is 100Vrms, curve 601 represents the rectified sinusoidal voltage waveform of VIN and curve 602 represents the voltage across the active LED sections. When the AC line voltage is 100Vrms, the LED output current is automatically regulated at 80.6 mA, shown a curve 603. When the AC line voltage is 120Vrms, curve 604 represents the rectified sinusoidal voltage waveform of VIN and curve 605 represents the voltage across the active LED sections. When the AC line voltage is 120Vrms, the LED output current is regulated at 60.2 mA, shown as curve 606. The average output power always remains at 5.0 W.

In summary, the weighted current mirror array 420 faithfully tracks the shunt regulators' conduction time and the output power of the LED sections. The said mean power integrator 430 generates a mean power value 433 based on the weighted current mirror copies IM1, IM2 and IM3 it receives from the weighted current mirror array 420. Any mismatch between this mean power value 433 and a predetermined mean power reference value 436 is amplified to produce an error voltage. Therefore, if there is any variation in VIN or LED forward voltage causing the mean power value to drift away from the pre-determined mean power reference value, the resulting error voltage is used by the current reference generator 440 to adjust the current reference values and to correct the momentary mismatch within a few line cycles.

Figure 2:
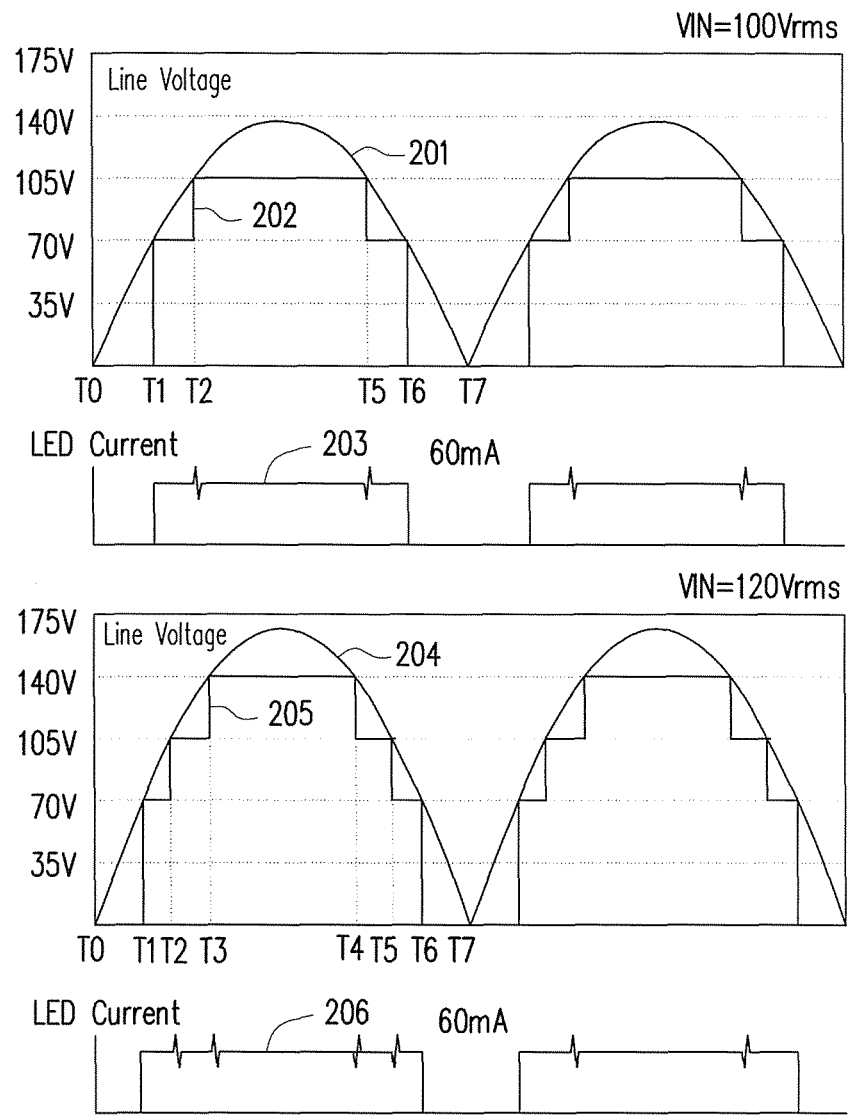
FIG. 2 and FIG. 3 are schematic diagrams showing waveforms of utility line voltages and LED currents in the LED lighting driver of FIG. 1.
Figure 3:
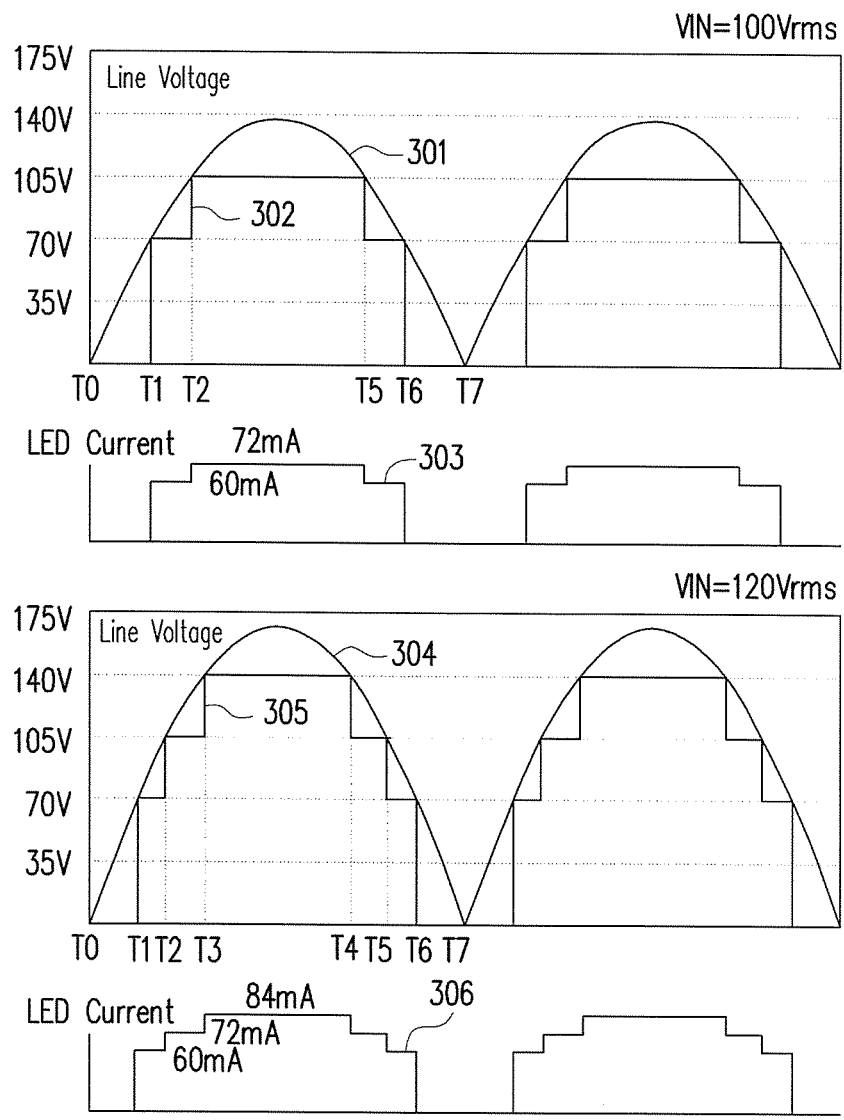

Another major issue with conventional linear LED lighting drivers is the LED current drops to zero when the rectified sinusoidal voltage VIN drops below the cut-in forward voltage of the first LED section, VF1. This is apparent from the curves 203 and 206 in FIG. 2, and curves 303 and 306 in FIG. 3. From T0 to T1, and from T6 to T7, the LED current drops to zero.

In the LED lighting industry, there is a so-called Current Ripple Ratio (CRR), which is defined as: CRR=[Imax−Imin]/Iave where Imax is the maximum LED current (or peak value) in a line cycle; Imin is the minimum LED current (or valley value) in a line cycle; and Iave is the average LED current in a line cycle.

In the case of curve 203, VIN=100Vrms, T1=1.412 ms, T6=6.921 ms, we have Imax=60 mA, Imin=0 mA, and Iave=60 mA*(T6−T1)/8.33 ms=60 mA*0.661=39.7 mA. Therefore the CRR is 1.512. Similarly, we can calculate in the case of curve 206, the CRR is 1.439.

Some scientists in the lighting industry claim that output lumen variation in an LED lighting with high CRR value (e.g. >1.0) may cause eye fatigue to people working or reading long hours under such LED lighting. Therefore one aspect of the present invention is to provide a method to prevent the LED current from dropping to zero, and thus to eliminate the LED current ripple entirely or to greatly reduce the current ripple ratio. The method consists of two steps. The first step is to add a valley-filled capacitor buffer; the second step is to use a larger number of LED sections and matching shunt regulators, thereby the first LED section has a lower forward voltage value.

Figure 7:
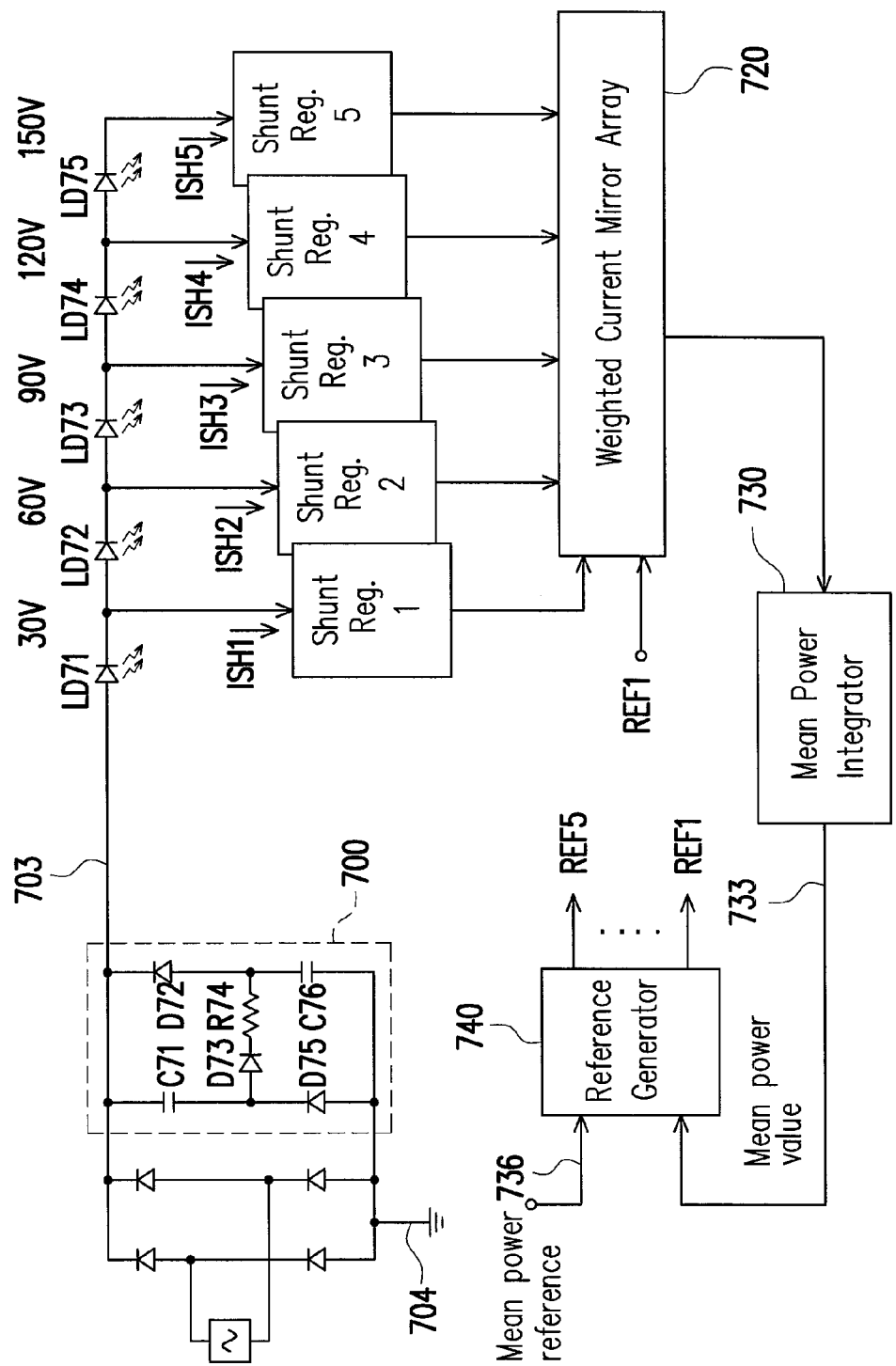
FIG. 7 is a schematic diagram showing an LED lighting driver according to another embodiment of the present invention.

FIG. 7 shows an alternative embodiment of the present invention. There are two differences from the FIG. 4 circuit. Firstly, there is an additional valley-filled capacitive buffer 700 coupled to the rectified sinusoidal voltage 703. Secondly, this alternative embodiment uses 5 LED sections LD71-LD75 and 5 matching shunt regulators. The other components, such as ground 704, rectified sinusoidal voltage input 703, weighted current mirror array 720, mean power integrator 730, mean power value 733, mean power reference value 736, and reference generator 740, are the same as or similar to their counterparts in the FIG. 4 embodiment. In this exemplar embodiment, each LED section has the same forward voltage of 30V. And assume in a steady-state condition, each shunt regulator maintains a shunt current at 60 mA once it is activated.

The valley-filled capacitor buffer 700 includes two hold-up capacitors C71 and C76, one charge diode D73, one charge-current limiting resistor R74, and two discharge diodes D72 and D75. The hold-up capacitor C71 is coupled to the rectified sinusoidal voltage 703. The discharge diode D72 is also coupled to the rectified sinusoidal voltage 703. The discharge diode D75 is coupled between the hold-up capacitor C71 and the ground 704. The hold-up capacitor C76 is coupled between the discharge diode D72 and the ground 704. The charge diode D73 is coupled to the hold-up capacitor C71 and the discharge diode C75. The charge-current limiting resistor R74 is coupled to the charge diode D73, the discharge diode D72, and the hold-up capacitor C76.

Figure 8:
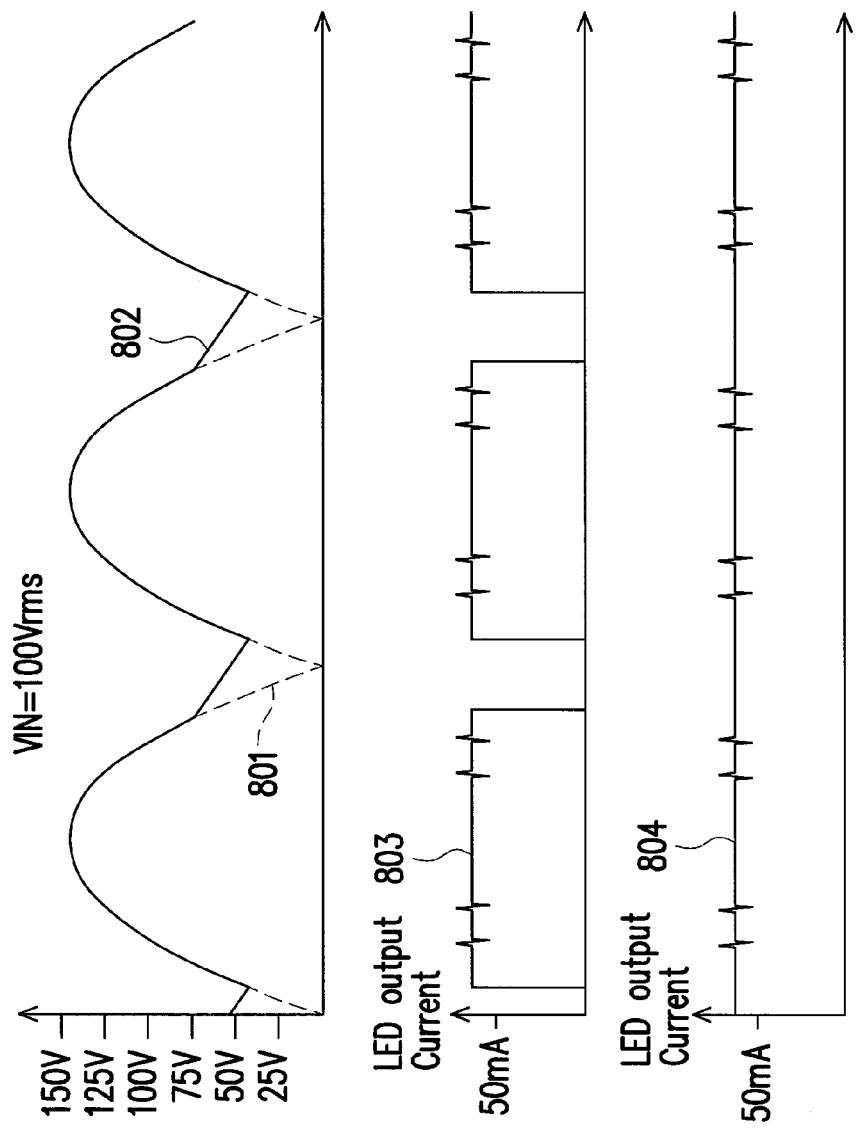
FIG. 8 is a schematic diagram showing waveforms of utility line voltages and LED currents in the LED lighting driver shown in FIG. 7.

Please refer to the curves in FIG. 8. Curve 801 is the original rectified sinusoidal voltage waveform VIN 703 before the valley-filled capacitive buffer 700 is added. Whereas curve 802 is the rectified sinusoidal voltage waveform YIN 703 after the valley-filled capacitive buffer 700 is added. Notice that when VIN 703 rises substantially to its peak value, it charges the two hold-up capacitors C71 and C76 through diode D73 and resistor R74. Since the two capacitors are charged in a series connection, each capacitor is substantially charged to one half of the peak value of VIN 703.

Notice further, when the instantaneous voltage of VIN 703 rises above one half of its peak value, the LED current is supported by VIN 703, not by the hold-up capacitors C71 and C76. Capacitors C71 and C76 are in standby condition. However, as soon as the input voltage VIN 703 drops below one half of its peak value, capacitor C71 starts to discharge via diode D75 substantially to a hold-up level higher than the forward voltage VF1 of the LED section LD71, and capacitor C76 starts to discharge via diode D72 substantially to the hold-up level. In effect, each of capacitors C71 and C76 supplies 30 mA to keep the shunt regulator(s) maintaining a 60 mA LED current.

Also shown in FIG. 8, curve 803 is the LED current waveform in the case without the valley-filled capacitor buffer 700. The LED current drops to zero as soon as VIN 703 drops below the forward cut-in voltage of the first LED section, VF1. In contrast, with the valley-filled capacitor buffer 700, the LED current can be maintained at 60 mA level without any dips, shown as curve 804. Therefore, the valley-filled capacitor buffer 700 can effectively reduce or eliminate the ripples of the LED current flowing through the LED sections.

However, it is important to know that each of hold-up capacitors C71 and C76 needs a sufficient capacitance to support the 60 mA LED current for the duration when VIN 703 drops below one half of its peak value. In the 100Vrms, 60 Hz input voltage condition, the total hold-up time requirement is 2.778 ms. This requires a minimum capacitance of Cmin for each hold-up capacitor.

$$Cmin=30\ mA*2.778\ ms/(0.5*1.4*100V-VF1)$$

where VF1 is the forward voltage of the first LED section.

It is important to understand that, in order to reduce the sizes of hold-up capacitors C71 and C76, VF1 should be made sufficiently low. One way to obtain a lower VF1 is including more LED sections and shunt regulators in the LED lighting driver. In this exemplar embodiment, VF1=30V, therefore Cmin is found to be 2.08 uF. In comparison, if VF1 were 60V instead of 30V, Cmin would be 4 times as large, or 8.32 uF. If VF1 were 70V or higher, then the valley-filled capacitor buffer would be rendered useless.

In summary, the present invention sets forth a simple linear LED lighting driver which can maintain constant output power against input AC voltage variation. Another aspect of the present invention is to provide a solution to maintain the LED current at a constant value throughout a line cycle.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light-emitting diode (LED) lighting driver, comprising:
a bridge rectifier, providing a rectified sinusoidal voltage by receiving and rectifying a utility alternating current (AC) voltage;
a plurality of LED sections coupled in series, wherein the first LED section is coupled to the rectified sinusoidal voltage;
a plurality of shunt regulators coupled to the LED sections, wherein each of the shunt regulators regulates a shunt current according to a current reference value, each of the shunt currents flows from a terminal of one of the LED sections to a ground;
a weighted current mirror array coupled to the shunt regulators and providing a plurality of copy currents, wherein each of the copy currents tracks a conduction time of one of the shunt regulators and also tracks an instantaneous output power of the LED sections;
a mean power integrator, coupled to the weighted current mirror array, providing a mean power value by integrating the copy currents; and
a reference generator, coupled to the mean power integrator and the shunt regulators, providing the current reference values to the shunt regulators, wherein each of the current reference values is directly proportional to a difference between a mean power reference value and the mean power value,
wherein the weighted current mirror array comprises:
a primary current mirror, coupled to the reference generator, regulating a primary current according to one of the current reference values; and
a plurality of secondary branches, wherein each of the secondary branch comprises:
a current-generating transistor, coupled to the primary current mirror, generating one of the copy currents, wherein the one copy current is equal to an arithmetic product of the primary current and a weighted factor; and
a current switch, coupled to the current-generating transistor, one of the shunt regulators, and the mean power integrator, providing the one copy current to the mean power integrator when turned on by an output signal of the one shunt regulator.

2. The LED lighting driver of claim 1, wherein the output signal of the one shunt regulator indicates the conduction time of the one shunt regulator.

3. The LED lighting driver of claim 2, wherein the one shunt regulator comprises:
a current-sense resistor comprising a first terminal and a second terminal, the first terminal receiving the shunt current regulated by the one shunt regulator, the second terminal coupled to the ground; and
a comparator, coupled to the first terminal of the current-sense resistor and the current switch, comparing a voltage level at the first terminal of the current-sense resistor against a preset value and providing the output signal of the one shunt regulator.

4. The LED lighting driver of claim 1, wherein the weighted factor is determined by a channel width to channel length ratio of the current-generating transistor.

5. The LED lighting driver of claim 4, wherein the weight factor is directly proportional to an arithmetic product of a first factor and a second factor, the first factor is directly proportional to the current reference value received by the one shunt regulator, the second factor is a combined forward voltage of the LED sections from the first LED section to the LED section providing the shunt current regulated by the one shunt regulator.

6. The LED lighting driver of claim 1, wherein the mean power value tracks a mean output power of the LED sections.

7. The LED lighting driver of claim 6, wherein the mean power integrator comprises a low-pass filtering capacitor and a weighted-ratio scaling resistor coupled in parallel.

8. The LED lighting driver of claim 1, wherein the reference generator comprises:
- an operational amplifier, coupled to the mean power integrator, receiving the mean power value as an inverting input, receiving the mean power reference value as a non-inverting input, and outputting an error voltage;
- a voltage buffer, coupled to the operational amplifier, receiving and outputting the error voltage; and
- a voltage divider, coupled to the voltage buffer and the shunt regulators, generating the current reference values by dividing the error voltage.

9. The LED lighting driver of claim 8, wherein the reference generator further comprises:
- a compensation circuit, coupled to the error voltage, rendering a low cross-over frequency for the operational amplifier.

10. The LED lighting driver of claim 9, wherein the compensation circuit comprises a resistor and a capacitor coupled in series between the error voltage and the ground.

11. The LED lighting driver of claim 1, further comprising:
- a valley-filled capacitor circuit, coupled to the rectified sinusoidal voltage and the LED sections, reducing or eliminating ripples of an LED current flowing through the LED sections by being charged by the rectified sinusoidal voltage and discharging to provide the LED current.

12. The LED lighting driver of claim 11, wherein the valley-filled capacitor circuit comprises:
- a first hold-up capacitor, coupled to the rectified sinusoidal voltage;
- a first discharge diode, coupled to the rectified sinusoidal voltage;
- a second discharge diode, coupled between the first hold-up capacitor and the ground;
- a second hold-up capacitor, coupled between the first discharge diode and the ground;
- a charge diode, coupled to the first hold-up capacitor and the second discharge diode; and
- a charge-current limiting resistor, coupled to the charge diode, the first discharge diode, and the second hold-up capacitor.

13. The LED lighting driver of claim 12, wherein
- the rectified sinusoidal voltage charges each of the first hold-up capacitor and the second hold-up capacitor substantially to one half of a peak value of the rectified sinusoidal voltage when the rectified sinusoidal voltage substantially rises to the peak value;
- each of the first hold-up capacitor and the second hold-up capacitor is discharged substantially to a hold-up level higher than a forward voltage of the first LED section and the first hold-up capacitor and the second hold-up capacitor provide the LED current when the rectified sinusoidal voltage drops below one half of the peak value.

* * * * *